United States Patent
Wang et al.

(10) Patent No.: US 9,758,627 B2
(45) Date of Patent: Sep. 12, 2017

(54) CONTINUOUS MANUFACTURING PROCESS FOR RUBBER MASTERBATCH AND RUBBER MASTERBATCH PREPARED THEREFROM

(71) Applicant: EVE RUBBER INSTITUTE CO., LTD., Qingdao, Shandong (CN)

(72) Inventors: Mengjiao Wang, Bedford, MA (US); Jianjun Song, Shandong (CN); Deying Dai, Shandong (CN)

(73) Assignee: EVE RUBBER INSTITUTE CO., LTD., Shandong (CN)

( * ) Notice: Subject to any disclaimer, the term of this patent is extended or adjusted under 35 U.S.C. 154(b) by 0 days.

(21) Appl. No.: 14/909,936

(22) PCT Filed: Jul. 22, 2014

(86) PCT No.: PCT/CN2014/082715
§ 371 (c)(1),
(2) Date: Feb. 3, 2016

(87) PCT Pub. No.: WO2015/018282
PCT Pub. Date: Feb. 12, 2015

(65) Prior Publication Data
US 2016/0168341 A1   Jun. 16, 2016

(30) Foreign Application Priority Data
Aug. 5, 2013   (CN) .......................... 2013 1 0338268

(51) Int. Cl.
| C08J 3/22 | (2006.01) |
| B29B 7/30 | (2006.01) |
| B29B 7/58 | (2006.01) |
| B29B 7/90 | (2006.01) |
| C08L 9/00 | (2006.01) |
| C08K 3/04 | (2006.01) |
| C08K 3/22 | (2006.01) |
| B29B 7/74 | (2006.01) |

(52) U.S. Cl.
CPC ................. *C08J 3/226* (2013.01); *B29B 7/30* (2013.01); *B29B 7/58* (2013.01); *B29B 7/7495* (2013.01); *B29B 7/90* (2013.01); *C08K 3/04* (2013.01); *C08K 3/22* (2013.01); *C08L 9/00* (2013.01); *C08J 2309/00* (2013.01); *C08K 2003/2296* (2013.01)

(58) Field of Classification Search
CPC ........... B29B 7/30; B29B 7/7495; B29B 7/90; C08K 3/04; C08K 3/22; C08J 3/226
USPC ......................................... 523/351; 524/571
See application file for complete search history.

(56) References Cited

U.S. PATENT DOCUMENTS

| 2,769,795 | A  | 11/1956 | Braendle |
| 3,048,559 | A  | 8/1962  | Heller et al. |
| 3,079,360 | A  | 2/1963  | Sutherland, Jr. et al. |
| 3,767,605 | A  | 10/1973 | Gerlicher |
| 6,040,364 | A  | 3/2000  | Mabry et al. |
| 6,048,923 | A  | 4/2000  | Mabry et al. |
| 6,372,822 | B1 | 4/2002  | Chung et al. |

FOREIGN PATENT DOCUMENTS

| CN | 101463149 | 6/2009 |
| CN | 103113597 | 5/2013 |
| CN | 103159990 | 6/2013 |
| CN | 103600435 | 2/2014 |
| JP | 2012214566 | 11/2012 |

OTHER PUBLICATIONS

CN 103113597 machine translation of original document dated (2013).*
International Search Report cited in PCT Application No. PCT/CN2014/082715 dated Oct. 29, 2014.
Written Opinion cited in PCT Application No. PCT/CN2014/082715 dated Oct. 29, 2014.
European Search Report cited in PCT Application No. PCT/CN2014/082715 dated Mar. 14, 2017.
First Office Action in Chinese Application No. 201310338268.1 dated Mar. 10, 2015.
Second Office Action in Chinese Application No. 201310338268.1 dated Sep. 21, 2015.
"Determining a Designing Scheme", Course Design for Principles of Chemical Engineering, Jul. 31, 1994, Teaching and Research Office of Principles of Chemical Engineering, Dalian University of Technology, Determining a Designing Scheme, p. 187.
Wu et al., "Drying", Rubber Processing Technology, Drying, p. 153, Jun. 30, 2012.
Leshun Yu, "Multiple-kettle Coacervation Technique in Synthetic Rubber Production Using Solution Methods", China Synthetic Rubber Industry, Dec. 31, 1978, pp. 1~8.

* cited by examiner

Primary Examiner — Edward Cain
(74) Attorney, Agent, or Firm — Workman Nydegger

(57) ABSTRACT

Disclosed are a continuous manufacturing process for a rubber masterbatch and a rubber masterbatch prepared therefrom. The manufacturing process comprises: 1): a filler is added to a rubber solution, forming a rubber/filler/solvent mixture by stirring; 2): the rubber/filler/solvent mixture obtained in step 1) is fed into a coagulator, and is coagulated after optionally being brought into contact and mixed with one or more fluids of nitrogen, steam, water, aqueous slurry of filler, and oil in the coagulator, resulting in a mixture of a rubber/filler composite and a solvent; 3): the mixture obtained in step 2) is directly passed into a heating medium at a temperature higher than the boiling point of the solvent, the polarity of the medium being different from that of the solvent used, the mixture is coagulated and deswelled, and the solvent is evaporated rapidly, thereby forming a mixture of a rubber/filler composite and the solvent containing the heating medium; and 4): the solvent is removed and the remaining mixture is dried, resulting in a rubber/filler masterbatch.

13 Claims, No Drawings

CONTINUOUS MANUFACTURING PROCESS FOR RUBBER MASTERBATCH AND RUBBER MASTERBATCH PREPARED THEREFROM

FIELD OF INVENTION

The invention relates to the field of rubber, especially to a method for continuously producing a rubber masterbatch and the rubber masterbatch prepared by the method.

BACKGROUND OF THE INVENTION

In the system of rubber/filler/additive/solvent, a step of the coagulation of rubber/filler/additive is a very important step in the manufacturing the masterbatch of rubber/filler/additive. WO98/58985 described a process in which a large turbo dryer with blades is operated in a device at 400/1200 rpm, and using this process, the coagulation is slow, the process is long and the energy consumption is high. The invention relates to several kinds of high-speed mixing machine/coagulator. The medium including gas will be coagulated inside, especially for high-temperature gas and liquid, which will be mixed instantaneously with rubber/filler/additive mixture under high-energy turbulent status. Due to the high-temperature effect of gas and the difference between liquid medium and solvent, the rubber/filler/additive in rubber/filler/additive mixture will produce the phenomenon of desolvation and coagulate. Due to high-speed turbulence effect, the mixture process between mixture and coagulation medium (that is, the desolvation medium), will complete in several milliseconds to several hundred milliseconds. As a result, the interface of desolvation medium and rubber/filler/additive/solvent is greatly increased. In this case, the coagulation speed of rubber/filler/additive coagulating in solvent is very fast. If the temperature of desolvation medium is somewhat higher, solvent will evaporate in the process of coagulation. This phenomenon will make further acceleration inside mixing machine/coagulator, due to the reduced pressure which is resulted from the high-speed movement of the fluid. In this case, compared to the existing method, the coagulator designed in the present application is characterized of high efficiency, energy-saving and continuous running of mixing and coagulation.

BRIEF SUMMARY OF THE INVENTION

In view of the existing technical problems, the purpose of the invention is to provide a method for continuously producing a rubber masterbatch and the rubber masterbatch prepared by the method. Another purpose of the invention is to provide a rubber article prepared by using the rubber masterbatch of this invention.

The advantages of the method for producing a rubber masterbatch continuously are listed as follows:

1) continuous and high-efficient,
2) uniform and quick mixing and coagulation,
3) significantly improved physical and mechanical properties of vulcanized rubber and rubber article quality, and
4) a broad scope of applications in the regard of the types and contents of rubber, filler and additives.

The present invention further relates to the following examples.

A method for continuously producing a rubber masterbatch comprises:

Step 1): Adding a filler to a rubber solution to form a rubber/filler/solvent mixture under stirring;

Step 2): Adding the rubber/filler/solvent mixture of step 1) into a coagulator, and optionally contacting and mixing with one or more fluid selected from the group consisting of nitrogen gas, vapor, water, slurry of filler and oil so as to coagulate, resulting in the mixture of rubber/filler composite and the solvent;

Step 3): Adding the mixture obtained in step 2) directly into a heating medium with a temperature higher than the boiling point of the solvent, in which the polarity of the heating medium is different from that of the solvent, the mixture being further coagulated and deswollen, and the solvent being evaporated quickly so as to form a mixture of rubber/filler composite containing the heating medium as well as the solvent;

Step 4): Removing the solvent and drying the remaining mixture to obtain the rubber/filler masterbatch.

Wherein, the solvent evaporated in step 4) and the monomers not reacted in the synthesis of rubber access into a condenser and a fractionator for recycling. The heating medium is separated, and the mixture separated from the heating medium is transferred into heating conveyer-belt type dryer and dried in vacuum, inert gas or air. Alternatively, the solvent evaporated in step 4) and the monomers not reacted in the synthesis of rubber access into a condenser and a fractionator for recycling, and then, the remaining mixture is processed by extrusion heat drying.

Preferably, wherein the solvent removed in step 4) is optionally recovered for recycling.

Preferably, wherein one or more additives selected from oil, anti-aging agent, coupling agent, active agent, antioxidant, flame retardant, heat stabilizer, light stabilizer, dye, pigment, vulcanizing agent and accelerant are optionally added in step 1) and/or step 2).

Preferably, wherein step 3) can be implemented using any type of container.

More preferably, wherein, step 3) shall be implemented in canned container, preferably cylindrical canned container.

Preferably, wherein, said heating medium of step 3) is water, said solvent is hydrocarbon solvent of which the boiling point is below 100° C. By vacuum drying, heat drying or extrusion heat drying and water removal, rubber/filler masterbatch can be obtained.

More preferably, wherein, said heat drying is oven drying or air drying.

More preferably, wherein, said extrusion heat drying is extrusion first so as to remove the heating medium and then a further drying.

More preferably, wherein, said further drying is air drying, oven drying or mechanical drying.

More preferably, wherein said mechanical drying implements the drying by utilizing open mill, kneading machine, internal mixer machine, continuous mixer, single screw extruder, twin-screw extruder.

The invention further provides rubber masterbatch prepared by said method.

Furthermore, the invention also provides a rubber article prepared by using the masterbatch.

The method for producing a rubber masterbatch continuously comprises the following steps:

Step 1): Adding a filler to a rubber solution to form a rubber/filler/solvent mixture under stirring;

Step 2): Adding the rubber/filler/solvent mixture of step 1) into a coagulator, and optionally contacting and mixing with one or more fluid selected from the group consisting of nitrogen gas, water vapor, water, slurry of filler and oil so as to coagulate, resulting in a mixture of rubber/filler composite and the solvent;

Step 3): Adding the mixture obtained in step 2) directly into a heating medium with a temperature higher than the boiling point of the solvent, in which the polarity of the heating medium is different from that of the solvent, the mixture being coagulated and deswollen, and the solvent being evaporated quickly so as to form a mixture of rubber/filler composite containing the heating medium as well as the solvent;

Step 4): Removing the solvent and drying the remaining mixture to obtain the rubber/filler masterbatch;

Wherein, the solvent evaporated in step 4) and the monomers not reacted in the synthesis of rubber access into a condenser and a fractionator for recycling. The heating medium is separated, and the mixture separated from the heating medium is transferred into heating conveyer-belt type dryer and dried in vacuum, inert gas or air. Alternatively, the solvent evaporated in step 4) and the monomers not reacted in the synthesis of rubber access into a condenser and a fractionator for recycling, and then, the remaining mixture is processed by extrusion heat drying.

The method for continuously producing a rubber masterbatch optionally further comprises a step of recovering the solvent removed in step 3) for recycling. In addition, one or more additives selected from oil, anti-aging agent, coupling agent, active agent, antioxidant, flame retardant, heat stabilizer, light stabilizer, dye, pigment, vulcanizing agent and accelerant are optionally added in step 1) and/or step 2).

Step 1) may be implemented by using the methods known in the art. Said stirring as described in Step 1) may be implemented by general stirrer, including but is not limited to, paddle stirrer, tank type stirrer, planetary stirrer, crank stirrer, and the like.

Step 1) may further comprise a fine dispersion step, in which said fine dispersion may be implemented by the following way: the mixture obtained after stirring is injected by a nozzle at high pressure under the condition of high shear, to improve the dispersion of filler and/or additive; the ejected material is rendered to pass through a multi-elbow pipe to make mixed solution collided with the wall of the tube in the tube, resulting in the increased dispersion of the filler and/or the additive; alternatively, the ejected material is rendered to pass through a pipe having varying inner diameters so as to change shear stress, resulting in the increased dispersion of the filler and/or the additive. The used pressure ranges from 0.1 MPa to 60 MPa, preferably 10 MPa to 40 MPa.

The mixture formed after said fine dispersion may be subjected by the following refined dispersion to further improve the dispersion of filler and/or additive in rubber solution:

i. The fine-dispersed mixture is added continuously into a ball mill and/or a colloid mill for dispersion, so that the filler and/or the additive are dispersed evenly in the rubber solution;

ii. The fine-dispersed mixture is added continuously into a grinder for grinding, so that the filler and/or the additive are dispersed fully in the rubber solution, in which the grinder has one or more sets of high speed rotating planar mill and a fixed pin or plate fixed on the mill sleeve and interleaved with the planar mill.

iii. The fine-dispersed mixture is added into a grinder for grinding continuously, in which the grinder has two blades rotating in the opposite directions, and the blades have a small orifice launder, dispersion degree of the filler and/or the additive in rubber solution can be improved by rotating blade under high pressure. The used pressure ranges from 0.1 MPa to 60 MPa, preferably 10 MPa to 40 MPa.

iv. The fine-dispersed mixture is continuously added into a multi-layer high pressure slit dispersion machine, so as to extrude the mixture from the slit between the two layers at high pressure, the strong shear force produced can improve the dispersion degree of the filler and/or the additive in the rubber solution. The used pressure ranges from 0.1 MPa to 60 MPa, preferably 10 MPa to 40 MPa.

v. The fine-dispersed mixture is continuously added to a power disperser device for dispersion, of which a high-speed rotating rotor has a lot of radially distributed slits or holes, the mixture collides with the surface of a stator at high speed to make the filler and/or the additive uniformly dispersed in the rubber solution.

Two or more than two of the above five fine dispersion methods can be used in series.

The rubber solution as described above may be directly obtained from the production line for preparation of solution-polymerized rubber, or can be prepared by dissolving any type of dry rubber in the solution of the dry rubber. When preparing rubber solution with dry rubber, the dry rubber may be any kind of rubber used in the art, such as natural polymer or synthetic polymer. Said natural polymer includes but is not limited to, natural rubber, gutta-percha, guayule, and the like; said synthetic polymer includes but is not limited to, monomer polymerized in solution (i.e., solution-polymerized rubber), monomer polymerized in emulsion, and the monomer polymerized by itself. When the rubber solution as described above is directly obtained from the production line for preparation of solution-polymerized rubber, the solution-polymerized rubber is a homopolymer or copolymer of ethylene, propylene, butene, pentene, hexene, heptene, diene having 4-7 carbon atoms or triene having 6-7 carbon atoms, or alkene monomer having other atoms or functional groups, in which said other atoms or functional groups are silicon atom, fluorine atom, chlorine atom, nitrogen atom, oxygen atom, sulfur atom, ester group, amino ester group, or cyan, and also include a homopolymer and copolymer having the monomers; including but not limited to, polybutadiene, polyisoprene, styrene butadiene rubber, ethylene-propylene rubber, butyl rubber, butadiene-acrylonitrile rubber, neoprene, silicone rubber, fluorine rubber, polyurethane rubber, chlorosulfonated polyethylene rubber, acrylate rubber, and the like. Rubber molecular weight is 1000 to 40 million, preferably 5000 to 30 million, and more preferably 10000 to 8 million.

The solvents in rubber solution are good solvents for all kinds of rubbers. Specifically, solvent may be aliphatic hydrocarbon solvent, aromatic hydrocarbon solvent, chlorinated hydrocarbon solvent, ketone solvent, ether solvent and ester solvent, the aliphatic hydrocarbon solvent includes but is not limited to all kinds of solvent gasoline, cycloalkane, substituted cycloalkane, normal alkane, the aromatic hydrocarbon solvent includes but is not limited to, benzene, toluene, xylene, and styrene, the chlorinated hydrocarbon solvent includes but is not limited to, methylene chloride, chloroform, carbon tetrachloride, ethylene dichloride, chlorobenzene, tetrachloroethylene, and chlorine toluene. The concentration of rubber in solution ranges from 1% to 60% by weight, preferably 5% to 40% by weight, and more preferably from 10% to 30% by weight.

Said filler includes but is not limited to, all kinds of solid powdered reinforcing agent and fillers used in rubber, such as various types of carbon black, silica, metal oxides, salts, different resins and nanoscale materials of the fillers. Wherein the metal oxide includes but is not limited to, aluminum oxide, magnesium oxide, zinc oxide, and the like, the salt includes but is not limited to, calcium carbonate, clay, and nanoscale materials of the fillers. The specific surface area of the filler is 0.1 to 800 m²/g, preferably 1 to 500 m²/g, and more preferably 5 to 300 m²/g. For carbon black, and silica (white carbon black), the oil absorption value thereof is 20 to 250 ml/100 g, preferably 25 to 200 ml/100 g, and more preferably 30 to 150 ml/100 g, wherein the filler includes the mixture thereof, such as multiphase filler, including but not limited to, dual phase or multiphase filler composed of carbon black, silica, alumina, magnesium oxide, zinc oxide, calcium oxide, titanium oxide, and boron oxide. For two phase or multiphase filler, the oil absorption value is 20 to 250 ml/100 g, preferably 25 to 200 ml/100 g, and more preferably 30 to 150 ml/100 g. The amount of filler used is between 5 and 300 parts by weight (based on 100 parts by weight of rubber), preferably 10 to 200 parts by weight, and more preferably 30 to 150 parts by weight. Said filler also includes a combination of two or more of the fillers.

Said filler also includes surface modified filler thereof. Wherein, the surface modification may be made by reactions to connect certain functional groups on the filler surface or by mixing or adsorption and combines modifier by physical way on the filler surface. For the modification, the modifier can be dissolved in solvent and mixed with the filler for liquid modification, such as described in Wang W, Nanse G, Vidal, A, et al., k. g. k. [J], 1994, 47:493, and also can be mixed with filler and heated for solid phase modification, such as described in Wang M J, Wolff. S. R. C. T [J], 1992, 65:715. Surface modification can also be performed before adding filler in rubber solution, or adding modifier to the mixture of rubber solution and filler for surface modification. The modifier described above is conventional modifier in the art, such as organic silane coupling agent expressed in the following general formula:

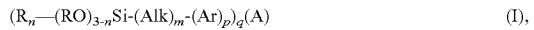
$(R_n-(RO)_{3-n}Si-(Alk)_m-(Ar)_p)_q(A)$ (I),

$R_n'(RO)_{3-n}Si-(Alk)$ (II), or

$R_n'(RO)_{3-n}Si-(Alk_{enyl})$ (III), in the formula, when q=1, A is —SCN, —SH, —Cl, or —NH₂;
when q=2, A is —S$_x$—.
R and R' refers to branched or linear alkyl or phenolic group with 1 to 4 carbon atoms. R and R' can be the same or different.
n 0, 1 or 2;
Alk is linear or branched alkyl containing 1 to 6 carbon atoms;
Alk$_{enyl}$ is linear or branched chain Alkenyl containing 1 to 6 carbon atoms;
m is 0 or 1;
Ar is aryl containing 6 to 12 carbon atoms;
p is 0 or 1, p and n cannot be 0 at the same time;
x is 2 to 8;
wherein the most commonly used modifier is bis (triethoxy propyl silane) tetrasulfide and disulfide, 3-sulfur cyano propyl-triethoxy silane, gamma-mercapto-trimethoxysilane, zirconium acid ester coupling agent, phthalate coupling agent, nitro coupling agent, and alcohol compound. The alcohol compound includes but is not limited to, monohydric alcohol, glycol, and polyol. The alcohol compound includes but is not limited to, propyl alcohol, butyl alcohol, ethylene glycol, polyethylene glycol and its derivatives.

In Step 1) of the invention, the filler and/or the additive may be directly added to the rubber solution, and can also be added firstly to solvent which is the same with that in the rubber solution or different, and mixed so as to form the uniform suspending liquid, and then added to rubber solution under stirring. The additive can optionally include one or more additives selected from oil, anti-aging agent, coupling agent, active agent, antioxidant, flame retardant, heat stabilizer, light stabilizer, dye, pigment, vulcanizing agent and accelerant. The amount of additives used is a conventional dosage, or is adjusted according to the requirement of the actual situation.

In step 2), the rubber/filler/solvent mixture of step 1) into coagulator, choosing one or more kinds of fluid out of nitrogen, vapor, water, slurry of filler and oil, making contact with the mixture, coagulating and getting the rubber/filler composite/solvent mixture.

Coagulator used in Step 2) may be tubular coagulator having one or two or more inlets, wherein feed direction of the inlets can be parallel with axial direction of the tube of the tubular coagulator, the outlet is arranged at the end of the tube, and can also be arranged at 1-180° with respect to the axial direction of the tube of the tubular coagulator, preferably 20-120°, more preferably 70-100°, and most preferably 85-95°. When there is multiple inlets, the feed direction of some inlets is parallel with axial direction of the tubular coagulator tube; feed direction of the rest of the inlets is arranged at 1-180° with respect to axial direction of the cylinder of tubular coagulator, preferably 20-120°, more preferably 70-100°, and most preferably 85-95°, the projection of the feed direction of the inlets in a cross section perpendicular to the axis of the tube is any direction between the radius direction of the cross section and the tangent direction of the cross section, preferably the radius direction, or the tangent direction. The feeding inlets are in the same plane vertical with axial direction of tube or the inlets are in different planes.

Coagulator used in Step 2) may be a coagulator composed of two or three or more concentric tubes, each of tubes has one or two or more inlets, of which the feeding direction is parallel to the axial direction of the tube or tangent direction of the tube and the outlet is arranged at the end of the tube. Fluid can directly enter, or enter from the tangent direction of the tube wall. The end of feeding inlet of each tube may be in the same plane, also be longer or shorter in terms of the end of feeding inlet of each tube from inside to outside in turn.

Coagulator used in Step 2) may also a cylinder coagulator, the cylinder coagulator has only one inlet, which is located on the top or wall of the coagulator, and the outlet is located in the lower end of the cylinder. Fluid can pass through the inlet to directly enter into the coagulator, and can also be injected into coagulator along the wall in the tangent direction.

Coagulator used in Step 2) can also be a cone type structure having barrel upper portion and the conical lower portion, and has one or two or more inlets. The feeding direction of feed inlet may be the tangent direction of the wall; each inlet can be in the same plane, and also can be in different plane. The feeding direction of inlets can also be perpendicular to the axial direction of the cylinder or at 1-180° with respect to the cylinder's axial direction, preferably 20-110°, more preferably 70-100°, and most preferably 85-95°. The projection of the feed direction of the inlets in a cross section perpendicular to the axis of the cone is any direction between the radius direction of the cross section and the tangent direction of the cross section, preferably the tangent direction.

As described in Step 2) one or more of fluids of nitrogen gas, water vapor, water, filler slurry and oil and water and rubber/filler/solvent mixture obtained in step 1) pass through one or more of the inlet into the coagulator, in which the temperature of nitrogen gas is 20-300° C., the temperature of the water vapor is 100-300° C., the temperature of the liquid water is 20-100° C., the temperature of the oil is 20-300° C., the temperature of slurry of filler is 20-100° C. The oil is commonly used in the field of rubber manufacturing. The oil in Step 1) and the oil in Step 2) oil can be the same or different. The fillers used in Step 1) and the fillers used in Step 2) can also be the same or different.

In step 3), the mixture which obtained in step 2) is added directly into heating medium of which the temperature is higher than the boiling point of the solvent. When the chemical polarity of heating medium is different from that of solvent, the mixture will coagulate and deswell. When the temperature of heating medium is higher than the boiling point of the solvent, the solvent will evaporate rapidly and form the masterbatch which contains the heating medium. By heating the masterbatch, heating medium will be removed and masterbatch products will be formed. During this process, the solvent which was evaporated and the monomer which was not reacted in rubber compounding access into a condenser and a fractionator for recycling. The obtained coagulation mixture is separated from the heating medium by filtration, and is dried to form masterbatch products. The above mentioned heating medium includes but not limits to water. When using water as the heating medium, the solvent is a solvent of which the boiling temperature is lower than 100° C. After that, the solvent which was evaporated, the monomer which was not reacted in rubber compounding and vapor access into a condenser and a fractionator for recycling.

The coagulation in step 3) can be implemented with any type of container, preferably a coagulator without any special design. The coagulation in step 3) can be implemented in canned container. Preferably, a canned container in any shape is used, and more preferably, cylindrical canned container.

Drying in Step 4) refers to the evaporated solvent and unreacted monomers in the synthesis of rubber are recovered into the condenser and the fractionating column, the heating medium is separated, and the mixture separated from the heating medium is transferred into heating conveyer-belt type dryer and dried in vacuum, inert gas or air; alternatively, the solvent evaporated in step 4) and the monomers not reacted in the synthesis of rubber access into a condenser and a fractionator for recycling, and then, the remaining mixture is processed by extrusion heat drying. When using water vapor as the heating medium, the solid mixture after drying contains water. Rubber/filler masterbatch is obtained by vacuum drying, heat drying or extrusion heat drying. The vacuum drying includes room temperature vacuum drying, frozen vacuum drying and heating vacuum drying. The heat drying may be a common drying method, such as oven drying or air drying. The extrusion heat drying is removal of heating medium by extrusion first and a further drying, wherein the further drying is air drying, oven drying or mechanical drying, said mechanical drying is drying by using an open mill, kneading machine, internal mixer, continuous internal mixer, single-screw extruder, and twin-screw extruder.

Said method for recovering solvents can be any known method in the art, such as the evaporated solvent is recovered by the method of condensation surface condensation or direct contact condensation. When using direct contact condensation method, water can be used as the coolant.

The advantageous features of the present invention are listed as follows:

i. An advantageous feature of the present invention is to use a specially designed coagulator. It is a device comprising one or more imports and an export. When a mixture of rubber/filler/additive/solvent after refined dispersion is injected into the coagulator under the conditions of high speed and high turbulence, as the speed is very high, according to the principle of fluid mechanics and fluid mechanics of turbulence, the internal pressure of the mixture gets down sharply. Under the effect of high shear, the mixture will form tiny droplets, and also due to the solvent with low boiling point in the liquid mixture could reach its boiling point under low pressure, the volatilization of the solvent accelerates, and the solvent is separated from the mixture. The separation process can also be realized by ejecting the vapor mixture containing a large number of droplets from the coagulator via a narrow export, and due to the increase of flow velocity, the pressure drops greatly, thus the rate and degree of evaporation of the solvent increases greatly. When the mixed fluid is injected into a drying device containing gas having a high temperature such as nitrogen, the rise of temperature makes the solvent quickly spread from the mixture to the hot atmosphere, and the drying efficiency is greatly increased.

ii. One way to coagulate and remove the solvent as described above according to the present invention is that the mixture of rubber/filler/additive/solvent is injected to one or two of multiple imports of the coagulator, while nitrogen is injected to the other one or more imports. When the mixture and gas are in a high-energy and high-speed turbulent state, the mixing of both can be completed within a few milliseconds to tens of milliseconds, and the mixture change into droplets within this time. The solvent in droplets rapidly swell and evaporate under low pressure of turbulent flow, which makes components of rubber/filler/additive in the mixture to quickly coagulate so as to form a dispersed solid/liquid/gas three-phase mixture. In the process, when the nitrogen injected to the coagulator is at high temperature, the swelling and evaporation of the solvent and coagulation of solids will be accelerated greatly, and the content of liquid components will be reduced greatly. In extreme cases, it becomes gas-solid two phases only formed by solid products of coagulation as well as nitrogen gas and solvent vapor. When three-phase or two-phase mixture passes through the narrow export of the coagulator, the rate and degree of the solvent evaporation further increase and the liquid phase decreases rapidly due to the increase of flow velocity to lower down the fluid pressure. When the mixed fluid is injected into the drying device containing gas with a high temperature such as nitrogen atmosphere, the residual solvent in rubber/filler/additive/solvent coagulation product further volatilizes quickly and spreads to the hot-gas phase due to the rise of temperature, which makes the drying efficiency greatly increased.

iii. One way to coagulate and remove the solvent as described above according to the present invention is that the mixture of rubber/filler/additive (which contains no or only a part of oil for rubber materials)/solvent is injected into the coagulator via one or two imports of multiple imports of the coagulator under high pressure and high speed if the oil is included in the additive, while the oil is injected through the other one or more imports. The amount of oil is the difference between the amount of oil required for masterbatch formula and the amount of already used oil in the mixture of rubber/filler/additive/solvent. Mixture and oil are mixed and coagulated rapidly under the condition of high-energy turbulence, and low pressure of high-speed turbulent fluid will make the solvent evaporate quickly and be separated from the rubber/filler/additive composite. If the temperature of the oil is increased, the evaporation process of the solvent will accelerate because the heat capacity of oil is big. After the mist-like mixture of solid, liquid and gas is injected into the drying device containing gas with a high temperature at a high speed via a narrow export, the contact area between gas and liquid in the mist-like mixture is further increased due to the reduced pressure of the fluid when injecting, so that the solvent evaporation becomes fast, and in the meanwhile, high temperature atmosphere also will greatly improve the efficiency of removing solvent.

iv. One way to coagulate and remove the solvent as described above according to the present invention is that the mixture of rubber/filler/additive/solvent is injected into the coagulator via one or two imports of multiple imports of the coagulator under high pressure and high speed, while high-pressure water vapor is injected to the other one or more imports. Under the deswelling action of water and high temperature, the coagulation for the rubber/filler/additive is completed in a few milliseconds to tens of milliseconds in the solvent, and is misk-like under low pressure, and the solvent volatilizes greatly. Due to the latent heat of vapor liquefaction, the rate of the evaporation of the solvent is much faster than that of hot nitrogen gas. But water in the formed mist-like three-phase mixture of solid, liquid and gas is also increased. When the mixture at high pressure is injected with high temperature gas at a high speed via the narrow exports of the coagulator, water and solvent evaporate and are separated from the solid rubber/filler/additive composite so as to form the gas phase due to decrease of pressure and further raise of temperature, increasing the drying efficiency of composite.

v. One way to coagulate and remove the solvent as described above according to the present invention is that the mixture of rubber/filler/additive/solvent is injected into the coagulator via one or two imports of multiple imports of the coagulator under the high pressure and high speed, and water, especially hot water under the condition of high pressure and high speed is injected into the rest imports of the coagulator at the same time. In a high-energy turbulent state, combined with the deswelling action of water for the solvent of rubber solution, the coagulation for the rubber/filler/additive is completed in a few milliseconds to tens of milliseconds. Due to low pressure characteristics of high-energy turbulent liquid, especially when using hot water, the solvent evaporate by rapidly reaching to the boiling point, the water also partially evaporates. When a three-phase mixture of solid, liquid and gas within the coagulator is injected to the drying device containing high-temperature air or nitrogen via its narrow export at high pressure, the low pressure fluid formed by high speed will disperse as a mist-like form in high-temperature air or nitrogen. The huge specific surface area of rubber/filler/additive solid/liquid phase coagulated in the mist and low pressure will make the water and solvent further volatilize, increasing drying effect of solid compound water and solvent. If too many water is injected to the coagulator, the composite coagulated by the rubber/filler/additive may be mixed in water. At this point, the composite containing water is separated from the water by general separation methods such as filtering, centrifugation, etc., and then dried.

vi. One way to coagulate and remove the solvent as described above according to the present invention is that the mixture of rubber/filler/additive/solvent is injected into the coagulator via one or two imports of multiple imports of the coagulator under the high pressure and high speed, and slurry of filler, especially high-temperature slurry of filler under the condition of high pressure and high speed is injected into the rest imports of the coagulator at the same time. In a high-energy turbulent state, combined with the deswelling action of water for the solvent of rubber solution, the rubber/filler/additive/solvent and the slurry of filler are uniformly mixed, and the coagulation for the rubber/filler/additive is completed in a few milliseconds to tens of milliseconds. Due to low pressure characteristics of high-energy turbulent liquid, especially when using high-temperature slurry of filler, the solvent evaporate by rapidly reaching to the boiling point, the water also partially evaporates. When a three-phase mixture of solid, liquid and gas within the coagulator is injected to the collection device containing high-temperature air or nitrogen via its narrow export at high pressure, the low pressure fluid formed by high speed will disperse as a mist-like form in high-temperature air or nitrogen. Due to low pressure and the huge specific surface area of rubber/filler/additive solid/liquid phase coagulated in the mist, the contacting surface between liquid phase and gas, resulting in that the solvent and water therein rapidly disperse into the gas phase. If water in the slurry of filler injected into the coagulator is too much and cannot completely evaporate after injection, the composite coagulated by the rubber/filler/additive may be mixed in water. At this point, the composite containing water is separated from the water by general separation methods such as filtering, centrifugation, etc., and then dried.

DESCRIPTION OF THE PREFERRED EMBODIMENTS

The present invention is further described by the examples blow, but the scope of the present invention is not limited to these examples.

1. THE EXPERIMENTAL DATA OF THE EXAMPLES IS DETERMINED BY THE FOLLOWING EQUIPMENTS AND MEASURING METHODS

TABLE 1

Equipments for the preparation of rubber samples

| No. | Name of Equipments | Specification/Model | Manufacturer |
|---|---|---|---|
| 1 | Internal mixer | XSM-1/10-120 | Shanghai Kechuang Rubber Plastics Machinery Co., Ltd. |
| 2 | Open Mill | 152.5*320 | Guangdong Zhanjiang machinery works |
| 3 | Flat Vulcanizing Machine | XLB-D600*600 | Zhejiang Huzhou Oriental Machinery Co., Ltd. |

TABLE 2

Methods and instruments for testing the physical properties of vulcanized rubber

| No. | Test Item | Test Standards | Name of Instruments | Specification/Model | Manufacturer |
|---|---|---|---|---|---|
| 1 | Dispersion of filler in rubber | — | Carbon Black Dispersion Instrument | GT-505-CBD | High Iron Testing Instrument Co., Ltd. |
| 2 | Hardness | GB/T 531.1-2008 | Sclerometer (Shao A) | LX-A | Shanghai LiuLing Instrument Plant |
| 3 | Tensile Strength (Mpa) | GB/T 528-2009 | Servo Control Tensile Testing Machine | A1-3000 | High Iron Testing Instrument Co., Ltd. |
| 4 | Elongation at Break (%) | GB/T 528-2009 | Servo Control Tensile Testing Machine | A1-3000 | High Iron Testing Instrument Co., Ltd. |
| 5 | Rebound Resilience (%) | GB/T 1681-2009 | Resilience Tester | GT-7042-RE | High Iron Testing Instrument Co., Ltd. |
| 6 | Heat Build-up | GB/T 1687-1993 | Heat Build-up Tester | RH-2000N | High Iron Testing Instrument Co., Ltd. |
| 7 | Abrasion Tester | GB/T 1689-1998 | DIN Abrasion Tester | GT7012-A | High Iron Testing Instrument Co., Ltd. |

2. EXAMPLES AND COMPARATIVE EXAMPLES

Raw material.

Synthetic polyisoprene rubber, IR-70, Qingdao Yikesi New Material Co., Ltd.

White carbon black, NEWSIL1165-MP, Wuxi Quecheng silicon Chemical Co., Ltd.

Zinc oxide, Dalian Zinc Oxide Co., Ltd.

Stearic acid, PF1808, Malaysia Integrated Fortune Sdn. Bhd.

Anti-aging agent 4020, Jiangsu Sinorgchem Technology Co., Ltd.

Silane coupling agent Si69, Nanjing Shuguang Chemical Group Co., Ltd.

Accelerating agent CZ, Shandong Sunsine Chemical Co., Ltd.

Accelerating agent DPG, Shandong Shanxian County Chemical Co., Ltd.

Sulfur, Wudi Jinsheng Chemical Co., Ltd.

Comparison Example 1

Comparative Example 1

56 parts of white carbon black and 5.6 parts of silane coupling agent Si69 were added to 100 parts of synthetic cis polyisoprene in an internal mixer for mixing, when a filler was mixed with rubber, 3.5 parts of zinc oxide, 2 parts of stearic acid, and 2 parts of anti-aging agent 4020 were added, mixed for 4 minutes then discharged from the internal mixer, then rolled and batched out by an open mill to obtain a premixed rubber. It was kept for 8 hours, and then, 2 parts of accelerating agent CZ, 1 part of accelerating agent DPG and 1.8 parts of sulfur were added to the premixed rubber in the open mill to prepare a mixed rubber. It was batched out from the open mill, and after it was kept for 8 hours, the mixed rubber was vulcanized in a flat vulcanizing machine under 150° C. until positive sulfuration, to prepare dry vulcanized rubber 1.

Example 1

56 parts of white carbon black, 5.6 parts of silane coupling agent Si69, and 3.5 parts of zinc oxide were added to 100 parts of 12% cis polyisoprene solution in N-hexane, the mixture of rubber, white carbon black, Si69, and N-hexane was mixed by a blade paddle stirrer, injected in a multi-elbow tube by a nozzle to make the mixed solution collided with wall of the tube in the tube, resulting in an increased dispersion of filler. Then the mixture was added to a grinder continuously for a refined dispersion, and a refinedly dispersed mixture was obtained. The mixture was then injected into a cone coagulator with four inlets by two inlets of the cone coagulator under the pressure of 30 MPa, and at the same time, nitrogen with a temperature of about 180° C. was added to the cone coagulator from the other two inlets thereof continuously. The obtained mixture was directly injected from the outlet of the coagulator into water of about 95° C. The obtained mixture was injected into a dryer filled with nitrogen with a temperature of about 150° C. continuously, the solvent and water was volatilized, and de-solvent rubber particles were formed. Then, the mixture of nitrogen and solvent containing powered rubber particles passed a cyclone separator to obtain powered masterbatch 1, and the solvent and water was recycled through condensation.

Example 2

56 parts of white carbon black, 5.6 parts of silane coupling agent Si69, and 3.5 parts of zinc oxide were added to 100 parts of 12% cis polyisoprene solution in N-hexane, the mixture of rubber, white carbon black, Si69, and N-hexane was mixed by a blade paddle stirrer, injected in a multi-elbow tube by a nozzle to make the mixed solution collided with wall of the tube in the tube, resulting in an increased dispersion of filler. Then the mixture was added to a grinder continuously for a refined dispersion, and a refinedly dispersed mixture was obtained. The mixture was then injected into a cone coagulator with four inlets by two inlets of the cone coagulator under the pressure of 30 MPa, and at the same time, water with a temperature of about 95° C. was added to the cone coagulator from the other two inlets thereof continuously. The obtained mixture was directly injected from the outlet of the coagulator into water of about 95° C. The coagulated de-solvent rubber particles were filtered for separation with water, dried in a vacuum dryer having a vacuum degree of −0.08 MPa for 20 min, collected, so as to provide masterbatch 2.

Example 3

56 parts of white carbon black, 5.6 parts of silane coupling agent Si69, and 3.5 parts of zinc oxide were added to 100 parts of 12% cis polyisoprene solution in N-hexane, the mixture of rubber, white carbon black, Si69, and N-hexane was mixed by a blade paddle stirrer, injected in a multi-elbow tube by a nozzle to make the mixed solution collided with wall of the tube in the tube, resulting in an increased dispersion of filler. Then the mixture was added to a grinder continuously for a refined dispersion, and a refinedly dispersed mixture was obtained. The mixture was then injected into a cone coagulator with four inlets by two inlets of the cone coagulator under the pressure of 30 MPa, and at the same time, water vapor under the pressure of 0.5 MPa was added to the cone coagulator from the other two inlets thereof continuously. The obtained mixture was directly injected from the outlet of the coagulator into water of about 95° C. The coagulated de-solvent rubber particles are filtered for separation with water, dried in a single screw extruder for 3 min so as to provide master batch 3.

2 parts of stearic acid and 2 parts of anti-aging agent 4020 were added to the above obtained masterbatches 1-3 in the internal mixer, and they were mixed for 4 min., discharged from the internal mixer, then rolled and batched out by an open mill. After it was mixed and then kept for 8 hours, 2 parts of accelerating agent CZ, 1 part of accelerating agent D and 1.8 parts of sulfur were added in the internal mixer, mixed for 1.5 min, and discharged from the internal mixer. The obtained rubber material was batched out by the open mill, and kept for 8 hours, vulcanized in a flat vulcanizing machine under 150° C. until positive sulfuration, so as to provide wet vulcanized rubber 1, 2 and 3.

TABLE 3

Physical properties of vulcanized rubber

|  | Dry vulcanized Rubber | Wet vulcanized Rubber 1 | Wet vulcanized Rubber 2 | Wet vulcanized Rubber 3 |
|---|---|---|---|---|
| Dispersion degree of white carbon black | 4.0 | 7.7 | 8.2 | 8.2 |
| Hardness, RT, Shao A. | 70.0 | 64.0 | 63.0 | 62.8 |
| Tensile Strength (Mpa) | 28.0 | 28.1 | 28.8 | 29.0 |
| Elongation at Break (%) | 480.0 | 505.0 | 460.0 | 448.0 |
| Rebound Resilience, (23° C., %) | 53.1 | 54.0 | 56.0 | 57.1 |
| Rebound Resilience, 60° C., % | 63.4 | 55.2 | 66.1 | 68.2 |
| Bottom Temperature Rise, ° C. | 21.7 | 19.4 | 17.8 | 15.8 |
| DIN Abrasion Index | 100.0 | 105.0 | 105.0 | 108.0 |

As shown in Table 3, using the same prescriptions, due to the different wet mixed rubber drying methods, the properties of the prepared vulcanized rubber are also different. Compared with the dry masterbatch, the dispersion degree of filler in wet masterbatch is greatly improved in the rubber, the tensile strength, rebound resilience and abrasion resistance of the vulcanized rubber are apparently improved, and heat generated by compression fatigue is reduced.

The invention claimed is:
1. A method for continuously producing a rubber masterbatch comprising:
 1) adding a filler in a rubber solution, and stirring to form a rubber/filler/solvent mixture;
 2) adding the rubber/filler/solvent mixture of step 1) into a coagulator, and optionally contacting and mixing with one or more fluid selected from the group consisting of nitrogen gas, water vapor, water, slurry of filler and oil so as to coagulate, resulting in a mixture of rubber/filler composite and the solvent;
 3) adding the mixture obtained in step 2) directly into a heating medium with a temperature higher than the boiling point of the solvent, in which the polarity of the heating medium is different from that of the solvent, the mixture being further coagulated and deswollen, and the solvent being evaporated quickly so as to form a mixture of rubber/filler composite containing the heating medium as well as the solvent;
 4) removing the solvent and drying the remaining mixture to obtain a rubber/filler masterbatch;
 wherein step 3) is implemented in a tank container;
 wherein the heating medium in step 3) is water, the solvent is a hydrocarbon solvent having a boiling point lower than 100° C., and optionally by vacuum drying, heat drying or extrusion heat drying for removal of water, the rubber/filler masterbatch is obtained;
 wherein, the solvent evaporated in step 4) and the monomers not reacted in the synthesis of rubber access into a condenser and a fractionator for recycling, the heating medium is separated, and the mixture separated from the heating medium is transferred into a heating conveyer-belt type dryer and dried in vacuum, inert gas or air; alternatively, the solvent evaporated in step 4) and the monomers not reacted in the synthesis of rubber access into a condenser and a fractionator for recycling, and then, the remaining mixture is processed by extrusion heat drying.

2. The method according to claim 1, wherein the solvent as removed in step 4) is recovered for recycling.

3. The method according to claim 1, wherein one or more additives selected from oil, an anti-aging agent, a coupling agent, an active agent, an antioxidant, a flame retardant, a heat stabilizer, a light stabilizer, a dye, a pigment, a vulcanizing agent and an accelerating agent are added in step 1) and/or step 2).

4. The method according to claim 1, wherein step 3) is implemented by using any container.

5. The method according to claim 1, wherein said heat drying is oven drying or air drying.

6. The method according to claim 1, wherein the extrusion heat drying comprises firstly extrusion to remove the heating medium, and then a further drying.

7. The method according to claim 6, wherein said further drying is air drying, oven drying, or mechanical drying.

8. The method according to claim 7, wherein said mechanical drying is performed using an open mill, kneading machine, internal mixer, continuous internal mixer, single-screw extruder, or twin-screw extruder.

9. A rubber masterbatch prepared by a method comprising:
 1) adding a filler in a rubber solution, and stirring to form a rubber/filler/solvent mixture;
 2) adding the rubber/filler/solvent mixture of step 1) into a coagulator, and optionally contacting and mixing with one or more fluid selected from the group consisting of nitrogen gas, water vapor, water, slurry of filler and oil so as to coagulate, resulting in a mixture of rubber/filler composite and the solvent;

3) adding the mixture obtained in step 2) directly into a heating medium with a temperature higher than the boiling point of the solvent, in which the polarity of the heating medium is different from that of the solvent, the mixture being further coagulated and deswollen, and the solvent being evaporated quickly so as to form a mixture of rubber/filler composite containing the heating medium as well as the solvent;

4) removing the solvent and drying the remaining mixture to obtain a rubber/filler masterbatch;

wherein step 3) is implemented in a tank container;

wherein the heating medium in step 3) is water, the solvent is a hydrocarbon solvent having a boiling point lower than 100° C., and optionally by vacuum drying, heat drying or extrusion heat drying for removal of water, the rubber/filler masterbatch is obtained;

wherein, the solvent evaporated in step 4) and the monomers not reacted in the synthesis of rubber access into a condenser and a fractionator for recycling, the heating medium is separated, and the mixture separated from the heating medium is transferred into a heating conveyer-belt type dryer and dried in vacuum, inert gas or air; alternatively, the solvent evaporated in step 4) and the monomers not reacted in the synthesis of rubber access into a condenser and a fractionator for recycling, and then, the remaining mixture is processed by extrusion heat drying.

10. A rubber article prepared by using the rubber masterbatch according to claim 9.

11. The method according to claim 1, wherein the tank container is a cylindrical tank container.

12. The method according to claim 1, further comprising using the rubber masterbatch to prepare a rubber article.

13. The rubber masterbatch according to claim 9, wherein the tank container is a cylindrical tank container.

* * * * *